(12) United States Patent
Feyereisen et al.

(10) Patent No.: US 9,390,559 B2
(45) Date of Patent: Jul. 12, 2016

(54) AIRCRAFT FLIGHT DECK DISPLAYS AND SYSTEMS AND METHODS FOR ENHANCED DISPLAY OF OBSTACLES IN A COMBINED VISION DISPLAY

(71) Applicant: HONEYWELL INTERNATIONAL INC., Morristown, NJ (US)

(72) Inventors: Thea L. Feyereisen, Hudson, WI (US); Gang He, Morristown, NJ (US); John G. Suddreth, Cave Creek, AZ (US); Patricia May Ververs, Ellicott City, MD (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 147 days.

(21) Appl. No.: 13/797,730

(22) Filed: Mar. 12, 2013

(65) Prior Publication Data

US 2014/0267422 A1    Sep. 18, 2014

(51) Int. Cl.
   *G09G 5/00*      (2006.01)
   *G06T 19/00*     (2011.01)
   *G01C 23/00*     (2006.01)
   *B64D 45/00*     (2006.01)

(52) U.S. Cl.
   CPC .............. *G06T 19/00* (2013.01); *B64D 45/00* (2013.01); *G01C 23/005* (2013.01); *Y02B 10/30* (2013.01)

(58) Field of Classification Search
   USPC ........................................... 345/634
   See application file for complete search history.

(56) References Cited

U.S. PATENT DOCUMENTS

| 5,181,028 A | 1/1993 | Sharpe et al. |
| 5,210,586 A * | 5/1993 | Grage ................... G01S 17/87 348/145 |
| 5,936,552 A | 8/1999 | Wichgers et al. |

(Continued)

FOREIGN PATENT DOCUMENTS

| EP | 1453010 A2 | 1/2004 |
| EP | 2196774 A2 | 6/2010 |

OTHER PUBLICATIONS

Calhoun, Gloria et al., "Synthetic vision system for improving unmanned aerial vehicle operator situation awareness" Defense and Security, International Society for Optics and Photonics, 2005, pp. 219-230.*

(Continued)

*Primary Examiner* — M Good Johnson
(74) *Attorney, Agent, or Firm* — Ingrassia Fisher & Lorenz, P.C.

(57) ABSTRACT

Systems and methods for enhanced display of obstacles in a combined vision display are provided. The system comprises a display unit and an enhanced vision system configured to generate first signals representative of enhanced vision images. Data storage device contains obstacle data representative of obstacles. Synthetic vision system is configured to selectively retrieve obstacle data from data storage device and generate second signals representative of synthetic vision images of one or more obstacles. Processor is in operable communication with display unit and coupled to receive first and second signals and configured, in response thereto, to: overlay the synthetic vision images of the one or more obstacles over the enhanced vision images and command display unit to display the synthetic vision images of the one or more obstacles overlaid over the enhanced vision images. The overlaid synthetic vision images of the one or more obstacles may be visually highlighted.

19 Claims, 3 Drawing Sheets

(56) References Cited

U.S. PATENT DOCUMENTS

| | | | |
|---|---|---|---|
| 6,150,960 A | 11/2000 | Voulgaris | |
| 6,173,220 B1 | 1/2001 | Schmitt | |
| 6,292,721 B1 | 9/2001 | Conner et al. | |
| 6,567,014 B1 | 5/2003 | Hansen et al. | |
| 6,686,850 B2 | 2/2004 | Hausmann | |
| 6,702,229 B2 | 3/2004 | Anderson et al. | |
| 7,148,861 B2 | 12/2006 | Yelton et al. | |
| 7,196,329 B1 | 3/2007 | Wood et al. | |
| 7,286,912 B2 | 10/2007 | Rubin et al. | |
| 7,295,135 B2 | 11/2007 | Younkin | |
| 7,312,725 B2* | 12/2007 | Berson | G01C 23/00 340/461 |
| 7,355,179 B1 | 4/2008 | Wood et al. | |
| 7,375,678 B2* | 5/2008 | Feyereisen | G01C 23/00 342/180 |
| 7,403,133 B2 | 7/2008 | He et al. | |
| 7,418,318 B2* | 8/2008 | Hrabak | G01C 23/00 340/945 |
| 7,471,214 B2 | 12/2008 | Feyereisen et al. | |
| 7,486,291 B2* | 2/2009 | Berson | G01C 23/00 340/980 |
| 7,605,719 B1 | 10/2009 | Wenger et al. | |
| 7,605,774 B1 | 10/2009 | Brandt et al. | |
| 7,668,374 B2 | 2/2010 | Harder et al. | |
| 7,724,155 B1 | 5/2010 | Anderson et al. | |
| 7,747,364 B2 | 6/2010 | Roy et al. | |
| 7,852,236 B2 | 12/2010 | Feyereisen | |
| 7,965,202 B1 | 6/2011 | Chiew et al. | |
| 8,010,245 B2 | 8/2011 | Nichols et al. | |
| 8,049,644 B1* | 11/2011 | Oehlert | G01C 23/00 340/963 |
| 8,200,433 B1 | 6/2012 | Siniff et al. | |
| 8,229,662 B2 | 7/2012 | Subelet et al. | |
| 8,232,910 B1 | 7/2012 | Burton | |
| 8,244,424 B2 | 8/2012 | Subelet et al. | |
| 8,264,379 B2 | 9/2012 | Whitlow et al. | |
| 8,285,478 B2 | 10/2012 | Subelet | |
| 8,296,056 B2 | 10/2012 | Becker et al. | |
| 8,400,330 B2 | 3/2013 | He et al. | |
| 8,718,915 B1* | 5/2014 | Turcios et al. | 342/176 |
| 8,896,480 B1* | 11/2014 | Wilson | G01S 13/953 342/176 |
| 2003/0179109 A1 | 9/2003 | Chamas et al. | |
| 2003/0222887 A1* | 12/2003 | Wilkins | G01C 23/005 345/618 |
| 2004/0169617 A1 | 9/2004 | Yelton et al. | |
| 2005/0007261 A1 | 1/2005 | Berson et al. | |
| 2005/0007386 A1 | 1/2005 | Berson et al. | |
| 2005/0099433 A1* | 5/2005 | Berson | B64D 47/08 345/619 |
| 2005/0232512 A1* | 10/2005 | Luk | G06K 9/6293 382/276 |
| 2005/0278753 A1* | 12/2005 | Brady | G06F 17/30861 725/76 |
| 2006/0055628 A1* | 3/2006 | Sanders-Reed | G01C 23/005 345/8 |
| 2006/0066459 A1 | 3/2006 | Burch et al. | |
| 2007/0018887 A1 | 1/2007 | Feyereisen et al. | |
| 2007/0070069 A1 | 3/2007 | Samarasekera et al. | |
| 2007/0085705 A1 | 4/2007 | He et al. | |
| 2007/0171094 A1 | 7/2007 | Alter et al. | |
| 2008/0215204 A1* | 9/2008 | Roy | G05D 1/0044 701/28 |
| 2008/0243383 A1* | 10/2008 | Lin | G01C 21/165 701/469 |
| 2008/0252489 A1 | 10/2008 | Naimer et al. | |
| 2008/0262664 A1 | 10/2008 | Schnell et al. | |
| 2009/0212994 A1 | 8/2009 | Hamza et al. | |
| 2010/0030405 A1 | 2/2010 | He et al. | |
| 2010/0141482 A1 | 6/2010 | Wyatt et al. | |
| 2010/0231705 A1* | 9/2010 | Yahav | G02B 27/01 348/115 |
| 2010/0268485 A1* | 10/2010 | Bey | G01F 15/022 702/45 |
| 2010/0309315 A1* | 12/2010 | Hogasten | H04N 5/33 348/164 |
| 2011/0210871 A1 | 9/2011 | Flotte et al. | |
| 2011/0227944 A1 | 9/2011 | Feyereisen et al. | |
| 2012/0026190 A1* | 2/2012 | He | G01C 21/00 345/633 |
| 2013/0050485 A1* | 2/2013 | Tiana | H04N 7/18 348/144 |
| 2013/0162632 A1* | 6/2013 | Varga | G06T 19/006 345/419 |

OTHER PUBLICATIONS

Jennings et al., "Synthetic vision as an integrated element of an enhanced vision system", AeroSense 2002, International Society for Optics and Photonics, pp. 10-17.*
Sykora, B.; Rotorcraft Visual Situational Awareness Solving the Pilotage Problem for Landing in Degraded Visual Environments, Presented at the American Helicopter Society 65th Annual Forum Grapevine, Texas, May 27-29, 2009. 2009 by the American Helicopter Society International, Inc.
Honeywell's Augmented-Reality Display (Almost) Gives Pilots X-Ray Specs: http://www.fastcodesign.com/1663491/honeywells-augmented-reality-display-almost-gives-pilots-x-ray-specs[Oct. 14, 2011 7:51:34 AM].
NASA Funds ESVS Research/Aviation International News: http://www.ainonline.com/?q=aviation-news/aviation-international-news/2010-11-30/nasa-funds-esvs-research[Oct. 14, 2011 7:57:30 AM].
EP Search Report, EP 11173167.5-1236 dated Nov. 21, 2011.
EP Communication, EP11173167.5-1236 dated Dec. 20, 2011.
Pasman, W. et al.; Accurate overlaying for mobile augmented reality, Computers & Graphics 23 (1999) 875-881.
EP Search Report, EP 10191441.4-2221 dated Mar. 29, 2011.
EP Communication, EP 10191441.4-2221 dated Apr. 5, 2011.
EP Communication, EP 10191441.4-2221 dated Dec. 13, 2011.

* cited by examiner

AIRCRAFT FLIGHT DECK DISPLAYS AND SYSTEMS AND METHODS FOR ENHANCED DISPLAY OF OBSTACLES IN A COMBINED VISION DISPLAY

TECHNICAL FIELD

The present invention generally relates to vehicle display systems, and more particularly relates to aircraft flight deck displays and systems and methods for enhanced display of obstacles in a combined vision display.

BACKGROUND

Many vehicles, such as aircraft, are commonly equipped with one or more vision enhancing systems. Such vision enhancing systems are designed and configured to assist a pilot when flying in conditions that diminish the view from the cockpit. One example of a vision enhancing system is known as a synthetic vision system (hereinafter, "SVS"). A typical SVS is configured to work in conjunction with a position determining unit associated with the aircraft as well as dynamic sensors that sense aircraft altitude, heading, and orientation. The SVS includes or accesses a database containing information relating to the topography along the aircraft's flight path, such as information relating to the terrain and known man-made and natural obstacles proximate the aircraft flight path. The SVS receives inputs from the position determining unit indicative of the aircraft location and also receives inputs from the dynamic sensors. The SVS is configured to utilize the position, heading, altitude, and orientation information and the topographical information contained in the database, and generate a three-dimensional image that shows the topographical environment through which the aircraft is flying from the perspective of a person sitting in the cockpit of the aircraft. The three-dimensional image (also referred to herein as an "SVS image") may be displayed to the pilot on any suitable display unit accessible to the pilot. The SVS image includes features that are graphically rendered including, without limitation, a synthetic perspective view of terrain and obstacles located proximate the aircraft's flight path. Using a SVS, the pilot can look at a display screen of the display unit to gain an understanding of the three-dimensional topographical environment through which the aircraft is flying and can also see what lies ahead. The pilot can also look at the display screen to determine aircraft proximity to one or more obstacles proximate the flight path.

Another example of a vision enhancing system is known as an enhanced vision system (hereinafter, "EVS"). A typical EVS system includes an imaging device, such as, but not limited to, a visible lowlight television camera, an infrared camera, or any other suitable light detection system capable of detecting light or electromagnetic radiation, either within or outside of the visible light spectrum. Such imaging devices are mounted to the aircraft and oriented to detect light transmissions originating from an area outside of the aircraft and typically located ahead of the aircraft in the aircraft's flight path. The light received by the EVS is used by the EVS to form an EVS image that is then displayed to the pilot on any suitable display unit in the cockpit of the aircraft. The sensor used in an EVS is more sensitive to light than is the human eye. Accordingly, using the EVS, a pilot can view elements of the topography that are not visible to the human eye. For this reason, an EVS is very helpful to a pilot when attempting to land an aircraft in inclement weather or at night. One advantage to an EVS system is that it depicts what is actually present versus depicting what is recorded in a database. However, the EVS system has low resolution and may not be sensitive enough to detect certain obstacles because of their size or other conditions. For example, thin radio towers, high voltage wires, cables, power lines, etc. represent a particularly insidious obstacle hazard, as they are difficult to detect by the EVS system even during daylight with good visibility conditions.

Combined vision displays include both a SVS image and an EVS image and may further include additional images, in the form of symbology. The symbology commonly appears as an icon or a series of icons on the display screen and may be indicative of the aircraft heading, direction, attitude, and orientation. With combined vision displays, the SVS and EVS images are commonly shown to the pilot on the same display screen. The EVS image (which may be smaller than the SVS image) may be overlaid on top of the SVS image such that the portion of the SVS image underlying the EVS image may not be visible or may be obscured (such as when the EVS overlay has a high level of opacity or is semi-transparent, respectively). The EVS overlay in a combined vision display may be visually partitioned into separate portions. The portion of the EVS image below an attitude reference (e.g., the zero pitch attitude for the aircraft) is displayed in a manner that provides a seamless transition to/from the underlying SVS image while the upper portion of the EVS image is displayed in a different color than the lower portion of the EVS image and in a manner that allows the underlying SVS image to be perceived. In this manner, a pilot can quickly and intuitively ascertain the relative attitude and/or relative altitude of the aircraft with respect to the features shown in the EVS image while maintaining situational awareness.

One important aspect of situational awareness is to be aware of obstacles that pose a collision threat to vehicles. This is particularly true for aircraft during take-off and landing or other low altitude operations and even more so in low visibility conditions. Terrain and obstacle images should be presented in such a way that they will provide timely awareness of the type, height, location, and distance of possible collision threats relative to the vehicle. In order to successfully avoid obstacles, the operator will have a short response time in which to determine how best to avoid the obstacles. Unfortunately, obstacle images in combined vision displays, even if within sensor detection range or in the database, may not be easily visible, thereby limiting obstacle awareness and decreasing the potential for obstacle avoidance.

Accordingly, it is desirable to provide systems and methods for enhanced display of obstacles in a combined vision display. It is desired to provide the pilot with heightened obstacle awareness by selectively bringing obstacle images to the front of the combined vision display and visually highlighting the obstacle images, thereby increasing the potential of obstacle detection and avoidance regardless of obstacle size, and other conditions. Furthermore, other desirable features and characteristics of exemplary embodiments will become apparent from the subsequent detailed description and the appended claims, taken in conjunction with the accompanying drawings and the foregoing technical field and background.

BRIEF SUMMARY

Systems are provided for enhanced display of obstacles in a combined vision display. In accordance with an exemplary embodiment, a system comprises a display unit, and an enhanced vision system configured to generate a first signal representative of enhanced vision images. A data storage device contains obstacle data representative of obstacles. A synthetic vision system is configured to selectively retrieve the obstacle data from the data storage device and generate a second signal representative of synthetic vision images of the one or more obstacles. A processor is in operable communication with the display unit and is coupled to receive the first and second signals and is configured, in response thereto, to: overlay the synthetic vision images of the one or more obstacles over the enhanced vision images and command the display unit to display the synthetic vision images of the one of more obstacles overlaid over the enhanced vision images.

Methods are provided for enhanced display of obstacles in combined vision displays in accordance with yet another exemplary embodiment of the present invention. The method comprises generating an enhanced vision image. A synthetic vision image of one or more obstacles is generated. The synthetic vision image of the one or more obstacles is selectively overlaid over the enhanced vision image. The synthetic vision image of the one or more obstacles overlying the enhanced vision images is selectively visually highlighted. The visually highlighted synthetic vision image of the one or more obstacles overlying the enhanced vision image is displayed.

Flight deck displays for an aircraft are provided in accordance with yet another exemplary embodiment of the present invention. The flight deck display has rendered thereon a primary flight display comprising a synthetic perspective image of topography for a region proximate the aircraft. The synthetic perspective image of topography comprises a synthetic vision image of obstacle data. An enhanced vision image overlies a portion of the synthetic perspective view of the topography. A synthetic vision image of obstacle data overlies the enhanced vision image.

Furthermore, other desirable features and characteristics of the systems and methods will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to systems and methods for enhanced display of obstacles in a combined vision display. Such systems and methods bring selected obstacle images to the front of the combined vision display and may visually highlight them, thereby making them more visually compelling and increasing situational and obstacle awareness. The system is configured to operate by selectively overlying synthetic vision system (SVS) images of one or more obstacles over an enhanced vision system (EVS) image in a combined vision display comprising a synthetic perspective image of topography and the EVS image and selectively visually highlighting the synthetic vision images of the one or more obstacles overlying the EVS image. The combined vision display may further comprise data symbology. The EVS image may be visually partitioned as hereinafter generally described and known in the art. Selectively overlying and visually highlighting the synthetic vision images of obstacles allows the flight crew to clearly identify visually the obstacle(s) to avoid and to provide a reference to gauge the height, distance, and location of the obstacle from the vehicle, thereby increasing the potential of obstacle detection and avoidance. Although embodiments described herein are specific to aircraft display systems, it should be recognized that principles of the inventive subject matter may be applied to other vehicle display systems.

Figure 1:
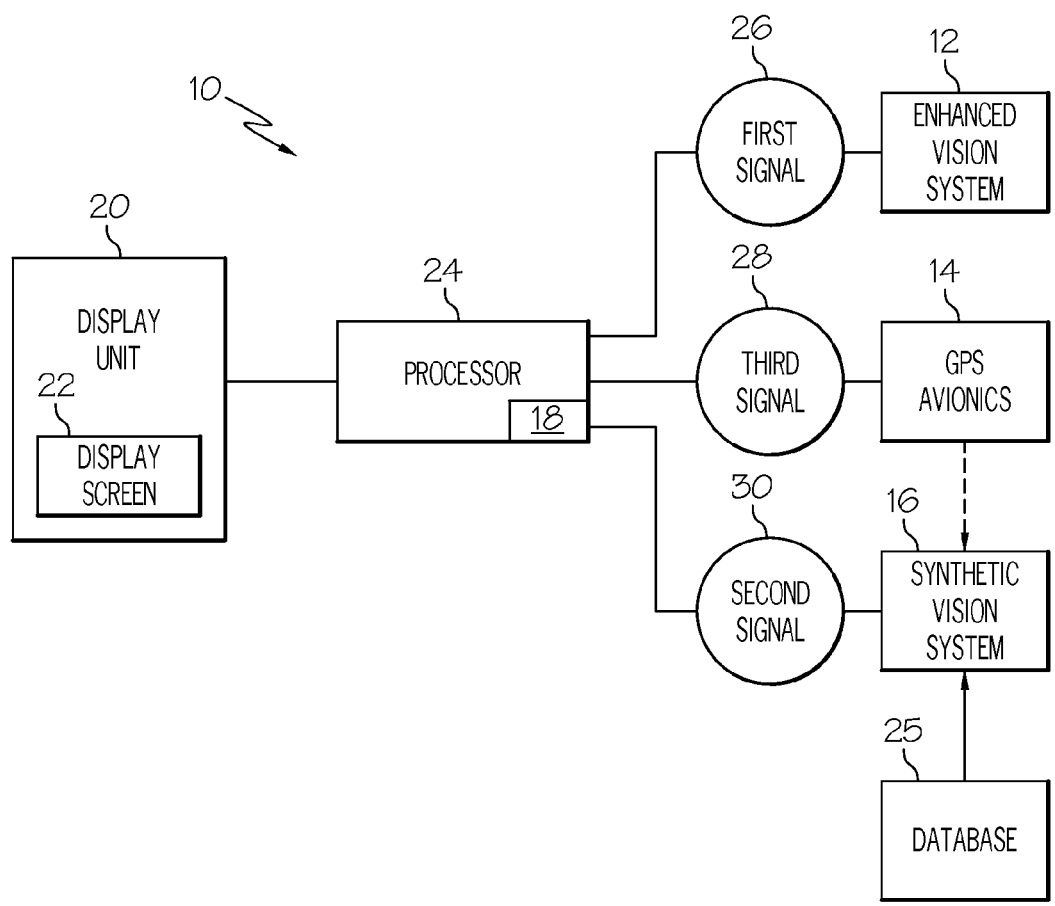
FIG. 1 is a schematic diagram of a system for enhanced display of obstacles in a combined vision display, according to exemplary embodiments of the present invention.

FIG. 1 is a simplified functional block diagram of a system 10 for enhanced display of obstacles in a combined vision display, according to exemplary embodiments. System 10 includes multiple components each of which may be configured for mounting to aircraft. In some embodiments, system 10 may be a self-contained system such that each of the components described below are contained in a single housing and are dedicated exclusively to serving the functions of system 10. In other embodiments, the various components described below may be standalone components or they may be components that are used as part of other systems and which are configured to be used as a shared resource between such other systems and system 10.

In the embodiment illustrated in FIG. 1, system 10 includes an enhanced vision system 12 ("EVS 12"), a position determining unit (such as a Global Positioning System (GPS), inertial navigation system, or the like) and avionics sensors 14, a synthetic vision system 16 ("SVS 16"), a display unit 20, display screen 22, and a processor 24. In other embodiments, system 10 may include either additional or fewer components.

EVS 12, as described in the background section above, includes one or more sensors adapted for mounting to an aircraft and configured to detect a light signature originating from outside the aircraft. The sensor may include a visible low light television camera, an infrared camera, millimeter wave (MMW) camera or any other light sensing device capable of detecting light either within, or outside of the visible spectrum. The light signature may include any light that is projected from, or that is reflected off of any terrain or object outside of the aircraft. The object may be an "obstacle" as used herein. As used herein, the term "obstacle" refers to man-made and naturally-occurring structures located proximate the vehicle travel path (such as an aircraft flight path), such as towers, buildings, antennas, power lines, wind turbines, forest edges, etc. The term "terrain" as used herein refers to land mass.

EVS 12 is configured to generate a first signal 26 and to provide first signal 26 to processor 24. First signal 26 is an electronic signal that includes information corresponding to the light signature detected by EVS 12 and that enables processor 24 to render an image of the light signature (referred to hereinafter as "the EVS image"). For example, if the detected light signature is of an obstacle, first signal 26 would enable processor 24 to render an EVS image of the obstacle. In some embodiments, EVS 12 may include a dedicated processor, a microprocessor, circuitry, or some other processing component that is configured to receive input from the one or more light detecting sensors and to generate first signal 26 using such inputs. In other embodiments, EVS 12 may not include a dedicated processor, microprocessor, circuitry or other processing component, in which case first signal 26 would comprise unprocessed inputs from the light detecting sensors of EVS 12 for processing by processor(s) 24.

First signal 26 may be a weak signal in the sense that the signature to be identified has very low contrast with respect to the background image because of size and/or weather conditions that may obscure the ability of EVS 12 to obtain a strong light signature or because of the distance of the aircraft from the light signature or for a variety of other factors. When first signal 26 is weak, the image corresponding to first signal 26 is easily overpowered and washed out, making it difficult to perceive the weak signatures contained in the EVS image. As a result, an obstacle corresponding to the first signal may not be discernible in the EVS image 36 or it may be very weak and can be easily missed. As a result, a pilot may not be able to see the obstacle in time to avoid the obstacle.

SVS 16, as described in the background section above, is configured to generate a three-dimensional image of the topographical environment around the aircraft (referred to hereinafter as "the SVS image") and to generate a second signal carrying SVS image and to provide the second signal to processor 24. The SVS 16 may access or include a data storage device 25 containing a database with data relating to the topography which may include information (data) relating to terrain and obstacles located along or at least proximate to the aircraft's flight path. The data storage device may contain such data for an entire geographical region such as a state, a country or continent. SVS 16 may also access or include the position determining unit that is configured to determine the position of the aircraft with respect to the surface of the earth. SVS 16 may be configured to receive course, speed, and other avionic inputs relating to the aircraft heading, altitude, and attitude. In equivalent embodiments, SVS 16 may receive the GPS and avionic inputs from the aircraft GPS and avionic sensors 14.

In some embodiments, SVS 16 may include a dedicated processor, microprocessor, or other circuitry that is configured to take the information pertaining to the position, attitude, altitude and heading of the aircraft and to utilize the information/data available in the database to generate a second signal 30 that may be utilized by processor 24 to render a three-dimensional image of the topographical environment through which the aircraft is traveling. As a pilot may wish to have a clearer and less cluttered view of potential obstacle(s) relative to the terrain surrounding the obstacle(s), system 10 may be configured to permit the pilot to visually highlight the synthetic vision images of obstacles to reduce any visual interference with the synthetic vision images of the terrain. The synthetic vision images of the obstacles may be visually highlighted by changing the color, opacity, or shape of the obstacles displayed in the synthetic vision images to visually distinguish the synthetic vision images of the obstacles from the synthetic vision images of the terrain or from obstacles that are already readily visible in the SVS image or EVS image, i.e., the processor is configured to change at least one visual characteristic of the synthetic vision images of the terrain and/or obstacles to visually distinguish the synthetic vision images of the obstacles from the synthetic vision images of the terrain data therein. For example, the opacity of the synthetic vision images of the obstacles may be increased relative to the opacity of the synthetic vision images of the terrain in the SVS image. In this regard, the display of obstacles (more specifically, obstacle images) has been enhanced in the SVS image. The enhanced display of the obstacles makes it easier for a pilot to detect and avoid the obstacles whose image is graphically rendered as part of the SVS image 34.

In other embodiments, SVS 16 may not include a dedicated processor, microprocessor, circuitry, or other processing component. In such embodiments, second signal 30 would contain the unprocessed sensor information and location data which could then be utilized by processor 24 to render the three dimensional image of the topographical environment, including the synthetic vision images of the obstacles and the synthetic vision images of the terrain. In either event, SVS 16 is configured to provide second signal 30 to processor 24.

Display unit is configured to provide the enhanced images to the operator. In accordance with an exemplary embodiment, the display may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (Thin Film Transistor) displays. The display unit may additionally be implemented as a panel mounted display, a HUD (Head-Up Display) Projection, or any one of numerous known technologies. It is additionally noted that the display unit may be configured as any one of numerous types of aircraft flight deck displays. For example, it may be configured as a multi-function display, a horizontal situation indicator, or a vertical situation indicator. In the depicted embodiment, however, the display unit is configured as a primary flight display (PFD) for an aircraft.

Additionally, display unit 20 includes a display screen 22 that is operatively connected to display unit 20. Display screen 22 is configured to be controlled by display unit 20 and may be used to display any type of image including, but not limited to, textual, graphics, and iconic information. In some embodiments, display unit 20 may include multiple display screens 22 and system 10 may include multiple display units 20.

Processor 24 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 24 may comprise a single processor or a plurality of processors acting in concert. In some embodiments, processor 24 may be dedicated for use exclusively with system 10 while in other embodiments processor 24 may be shared with other systems on board the aircraft. In still other embodiments, processor 24 may be integrated into any of the other components of system 10. For example, in some embodiments, processor 24 may be a component of EVS 12, SVS 16, or both.

Processor 24 is communicatively coupled to EVS 12, GPS/avionics 14, SVS 16 and is operatively coupled to display unit 20. Such communicative and operative connections may be effected through the use of any suitable means of transmission including both wired and wireless connections. For example, each component may be physically connected to processor 24 via a coaxial cable or via any other type of wire connection effective to convey electronic signals. In other embodiments, each component may be communicatively connected to processor 24 across a bus or other similar communication corridor. Examples of suitable wireless connections include, but are not limited to, a Bluetooth connection, a Wi-Fi connection, an infrared connection or the like.

Being communicatively and/or operatively coupled with EVS 12, GPS/avionics sensors 14, SVS 16, and display unit 20, provides processor 24 with a pathway for the receipt and transmission of signals, commands, instructions, and interrogations to and from and each of the other components. Processor 24 is configured (i.e. being loaded with and being capable of executing suitable computer code, software and/or applications) to interact with and to coordinate with each of the other components of system 10 for the purpose of overlaying images corresponding to first signal 26, second signal 30, and third signal 28. For example, in the illustrated embodiment, processor 24 is configured to receive second signal 30 from SVS 16 and to send a command to display unit 20 instructing display unit 20 to display corresponding SVS images on the display screen 22. Processor may also be configured to receive a third signal from the aircraft's GPS/Avionics system 14 for displaying data in an iconic format.

Processor 24 is also configured to receive first signal 26 from EVS 12 and to send a command to display unit 20 instructing display unit 20 to display the EVS image on display screen 22. Processor 24 is further configured to command display unit 20 to overlay the EVS image on top of a portion of the SVS image. Furthermore, because the EVS image is reflective of what is actually present along the aircraft's flight path, processor 24 (more specifically, image decisioner 18 thereof) may give precedence to the EVS image and may command display unit 20 to obscure the portion of the SVS image lying beneath the EVS image. The EVS and SVS images may be indexed at the time of camera installation, e.g., by aligning an EVS image sensor to ensure that the sensor and the SVS view are indexed. Such an indexing process may be periodically repeated during normal course of maintenance to assure proper alignment. When a known obstacle having a verified position is present, the SVS and EVS images thereof may be aligned during a relatively static phase of operations or on the ground.

As known in the art, processor may also be configured to visually partition the EVS image such that a first portion of the EVS image that is below a particular attitude reference (e.g., the zero pitch attitude for the aircraft) is visually distinguishable from a second portion of the EVS image that is above the attitude reference. For example, the lower portion of the EVS image may be displayed in a manner that provides a seamless transition to/from the underlying synthetic terrain. This may be done by displaying the lower portion of the EVS image in a color corresponding to the terrain that is adjacent to or otherwise proximate the lower portion and with a relatively high level of opacity. In contrast, the upper portion is displayed with a relatively high level of transparency or in a different color than the lower portion of the EVS image allowing the underlying synthetic terrain to be perceived.

In accordance with exemplary embodiments, processor 24 is also configured to selectively overlay synthetic vision images of one or more obstacles over the EVS images. In some embodiments, all the obstacles will be overlaid while in other embodiments, only synthetic vision images of selected obstacles overlying the EVS image will be overlaid. The processor is configured to select which obstacles are to be overlaid. The synthetic vision images of the obstacles are overlaid over the EVS images in a manner that enhances the pilot's ability to discern obstacles along the flight path. As noted previously, given typical limitations of EVS imaging systems in image quality, resolution, and weather-induced degradation, it may not be possible to detect obstacles ahead. For example, even under good weather conditions, thin radio towers or high voltage wires may not appear in the EVS image for various reasons, such as lack of temperature differentials or insufficient EVS image resolution. These obstacles are of great concern for low altitude flying operations. Therefore, synthetic vision images of such obstacles may be advantageously and selectively overlaid over the EVS images. On the other hand, for example, a large obstacle such as a building may be readily apparent in the EVS image due to its size, and therefore the synthetic vision image of the building need not be overlaid on top of the EVS image. The image decisioner 18 of processor 24 or the vehicle operator (such as, for example, an aircraft pilot) may select the synthetic vision images of the one or more obstacles to be overlaid in front of the EVS images. The selection may be based on different lateral dimensions of the obstacles (i.e., obstacle size), obstacle type, or both. Other considerations may bear on the decision to selectively overlay the synthetic vision images of the one or more obstacles over the EVS images. Such decisions or selections can also be done by typical EVS detection range considerations, i.e., if the weather condition is marginal and affecting the EVS detection range, the vehicle operator may choose to overlay and display synthetic vision images of one or more obstacles that are farther out than those in the standard EVS detection range.

Processor is also configured to selectively visually highlight the synthetic vision images of the one or more obstacles overlying the EVS image in the combined vision display. As used herein, the term "visually highlighted" or "visual highlighting" means that the obstacles are visually prominent against the underlying EVS image. In some embodiments, all the overlaid obstacles (more specifically, synthetic vision images of the obstacles) on display screen 22 will be visually highlighted while in other embodiments, only synthetic vision images of selected obstacles overlying the EVS image will be visually highlighted. The processor is configured to select which synthetic vision images of obstacles are to be visually highlighted. Some of the synthetic vision images of the obstacles may be semi-transparent, while others may be opaque. Visual highlighting may include blanking out portions of the SVS image, rendering portions of the EVS image at least partially transparent, diminishing the intensity of the EVS image, increasing the intensity of the SVS image of the one or more obstacles, or using any other technique that would enhance the pilot's ability to discern obstacles in the EVS image. It should be understood that the enhancements described above are exemplary and do not comprise an exhaustive list of techniques that may be employed by processor 24 to enhance the discernibility or visibility of obstacles in the topographical environment through which the aircraft is flying. The visual highlighting of the synthetic images of obstacles helps ensure heightened obstacle awareness. The obstacle type can be determined and the obstacle height, location, and distance can be estimated by using the current aircraft position, orientation, attitude information, etc. to determine the approximate location of the obstacle relative to the aircraft or other vehicle.

Processor 24 is also configured to send a command to display unit 20 instructing display unit 20 to display the visually highlighted synthetic vision images of the selected obstacles overlying the EVS images on display screen 22. Furthermore, as the obstacle data is reflective of what is actually present along and at least proximate the aircraft's flight path, processor 24 (more specifically, image decisioner 18 thereof) may give precedence to the visually highlighted synthetic vision images of the obstacles and may command display unit 20 to obscure the portion of the SVS image lying beneath the synthetic vision images of the obstacles overlying the EVS image. Processor is in operable communication with the image decisioner. Image decisioner may be a suitably configured and programmed computing device or in equivalent embodiments may be a software module executing on the processor. In other embodiments, the image decisioner may comprise firmware or may be manifested as a combination of hardware, firmware, and software. In still other embodiments, the image decisioner and the processor may work in tandem selecting the synthetic vision images of the obstacles to be overlaid and visually highlighted.

Figure 2:
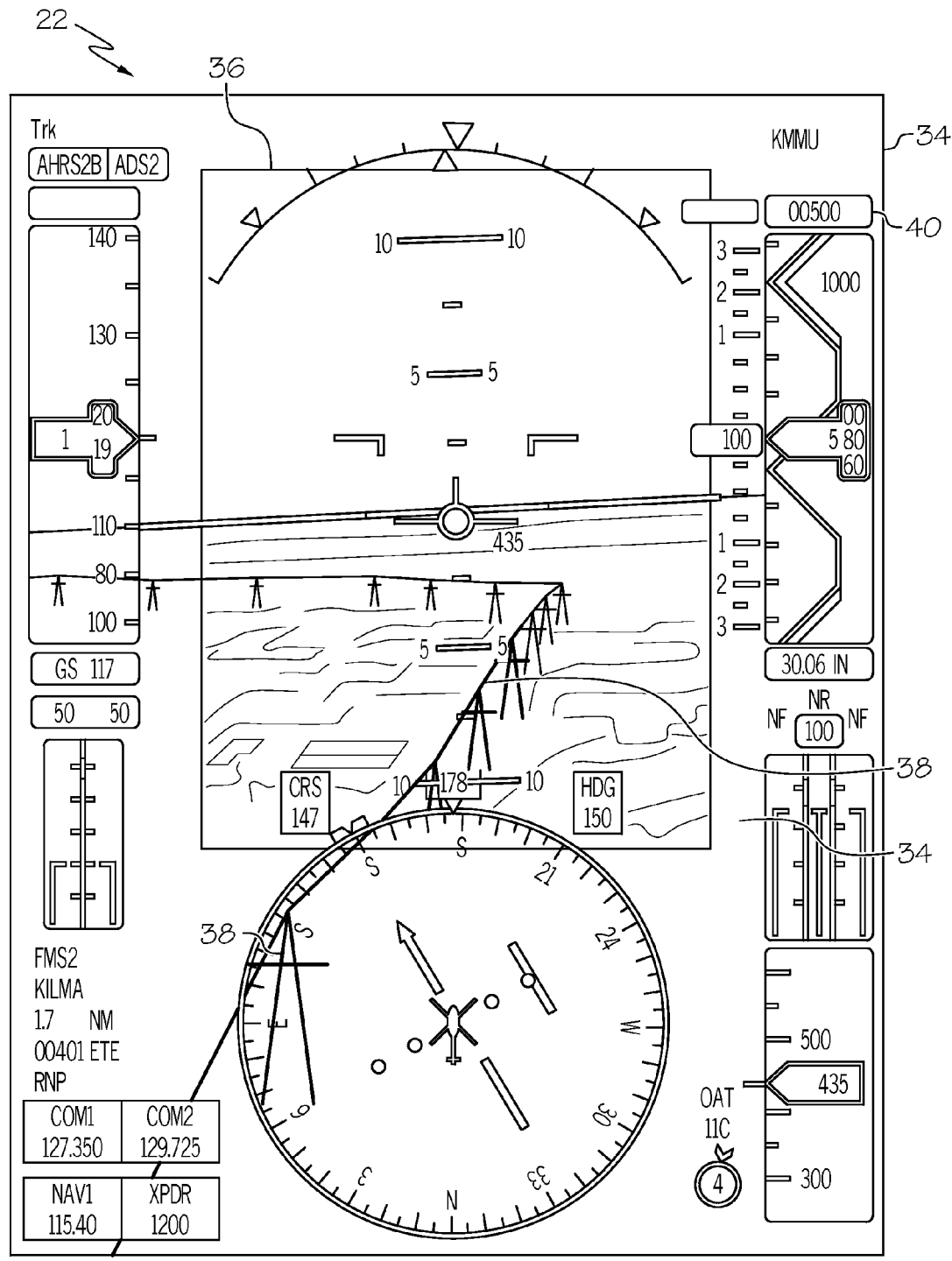
FIG. 2 is an exemplary flight deck display with an enhanced display of obstacles therein.
Figure 3:
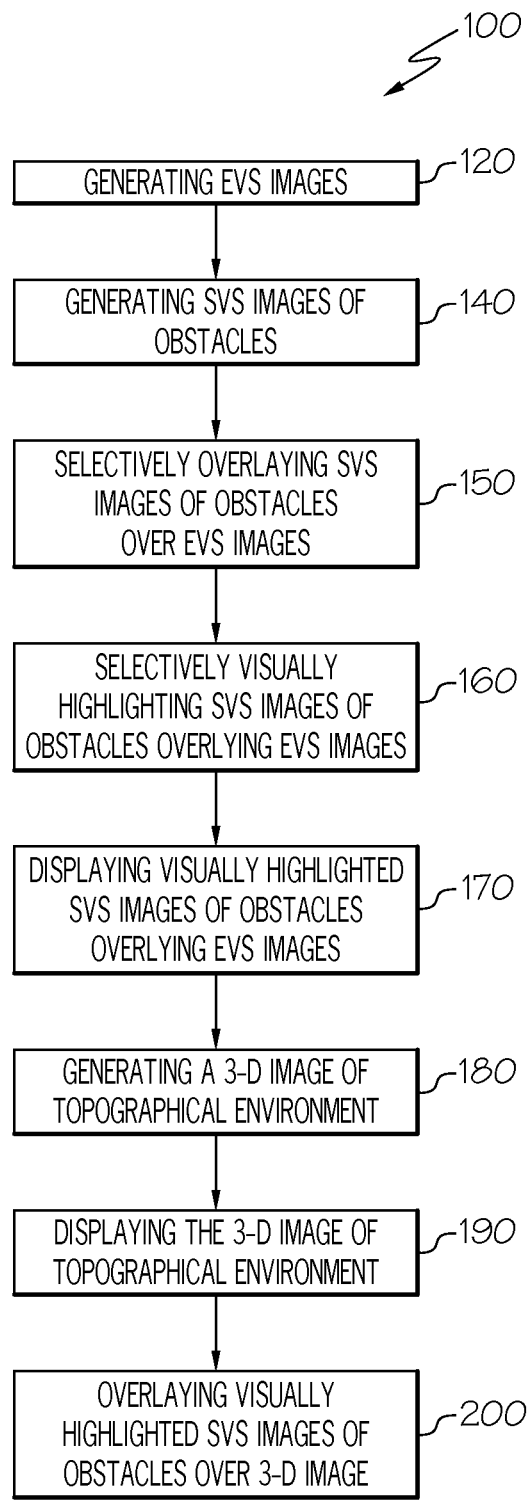
FIG. 3 is a flow diagram of a method for enhanced display of obstacles in a combined vision display, according to another exemplary embodiment of the present invention.

FIG. 2 is an exemplary picture of display screen 22 with an enhanced display of obstacles in the illustrated combined vision display comprising the SVS image 34 and the EVS image 36. FIG. 2 illustrates images that are presented to a pilot by system 10. The images displayed on display screen 22 include a synthetic vision image of obstacles 38 (more specifically, power lines) overlaid over the EVS image 36, the synthetic vision image of obstacles overlaid over the EVS image itself overlying a portion of an underlying synthetic vision image 34, and various iconic data 40. It should be appreciated that the display screen as depicted in FIG. 2 represents the state of a dynamic display frozen at one particular time, and that the display screen may be continuously refreshed during operation of the aircraft to reflect changes in the altitude and/or position of the aircraft.

The EVS image 36 obscures a portion of the underlying SVS image 34, including synthetic vision images of obstacles that would otherwise be displayed (i.e., visible) in the SVS image. The synthetic vision image of obstacles 38 is rendered in the SVS image and continued into the EVS image 36 portion of the display. The synthetic vision images of the obstacles 38 (here, power lines) in the overlaid EVS image are visually highlighted. The illustrated overlaid and visually highlighted power lines are clearly visible against the EVS image 36 in the combined vision display. While power lines are displayed as the exemplary obstacle, the synthetic vision images of other obstacles may be similarly overlaid and visually highlighted to be clearly visible in the combined vision display. The synthetic vision images of the power lines are visually highlighted by rendering the images with increased intensity relative to the EVS image. For example, the synthetic vision images of the illustrated power lines have a greater opacity than does the EVS image 36 itself making the obstacles easier to visualize. The obstacles within the EVS image window may be displayed with brighter color, intensity, or opacity different from the obstacles outside the window in the SVS only display area.

As noted previously, obstacles can be visually highlighted in the SVS image as the SVS image can be readily generated to allow, for example, darker or more opaque obstacle images to be rendered with minimum display clutter. In FIG. 2, the synthetic vision images of obstacles overlaid over the EVS image and rendered as part of the SVS image are visually highlighted. For example, the synthetic vision images of obstacles 38 within the EVS image window and rendered as part of the SVS image are displayed with brighter intensity different from the remaining portions of the EVS image. As a result of selectively overlaying and visually highlighting the synthetic vision image of obstacles over the EVS image, the combined vision image of FIG. 2 clearly illustrates the power lines in the topographical environment through which the aircraft is flying.

As illustrated, the obstacles that are displayed outside of EVS image 36 and in the SVS image only portion are unaffected by the obstacle overlay image, i.e., the obstacles that are located in the SVS image only portion have the same level of clarity and intensity as they had before the overlaying of the synthetic vision images of the obstacles over the EVS image. As noted previously, the obstacles graphically rendered in the SVS image only portion can be generally darker or have greater opacity than the terrain in the SVS image as the SVS image can be readily generated to allow a visually highlighted obstacle image to be rendered in the SVS image with minimum display clutter so as to visually distinguish between terrain and obstacles. While the format, including the intensity (brightness) for example, of the EVS image is predetermined, the format of the SVS features may be modified to improve the clarity of the image and recognition by the pilot. For example, the intensity of the SVS features (e.g., the selected obstacles) may be increased or decreased depending on the intensity of the EVS features being augmented. Additionally, the SVS features in EVS image regions may be a first color with the SVS features being a second color in the SVS only display region. Transparency and shape are further examples of the SVS feature format that may be modified to visually highlight the obstacles, thereby improving obstacle detection and avoidance. It should be understood that the enhancements described above are exemplary and do not comprise an exhaustive list of visual highlighting techniques that may be employed to enhance the discernibility or visibility of obstacles in the topographical environment through which the aircraft is flying.

FIG. 5 is a flow diagram of a method 100 for enhanced display of obstacles in a combined vision display in accordance with exemplary embodiments. In an exemplary embodiment, the method begins by generating enhanced vision system (EVS) images (step 120). The generation of an EVS image comprises, for example, the generation of infrared images or millimeter-wave images.

Method 100 for enhanced display of obstacles in a combined vision display continues by generating synthetic vision system (SVS) images of obstacles (step 140). Steps 120 and 140 are performed in the same timeframe. The data storage device 25 containing the database contains information (data) regarding terrain and obstacles for a travel path of the vehicle. The database is accessed and SVS images, each including a plurality of synthetic features, are generated based on the information accessed from the database, and travel conditions provided by the GPS/avionics 14. Travel conditions provided by the GPS/avionics 14 may include information such as aircraft position, heading, attitude, flight plan information of the vehicle, and flight information such as present altitude, speed, pitch, roll, and position. A portion of the SVS features may be selected. The processor then aligns the EVS features with the portion of the selected SVS features for display by the display unit 20 on the display screen 22.

Method 100 continues by overlaying the synthetic vision images of one or more selected obstacles over the EVS images (step 150). The process of selecting SVS features (e.g., which obstacles to be overlaid, visually highlighted, and/or displayed) may be accomplished by the pilot of the aircraft, determined by considering the operational status of the aircraft, or be predetermined by the system 10/processor.

Method 100 continues by selectively visually highlighting the synthetic vision images of the one or more obstacles overlying the EVS images (step 160). As noted previously, the synthetic vision images of the one or more obstacles may be selectively visually highlighted relative to other obstacles, the underlying EVS image(s), terrain images, or combinations thereof.

Method 100 continues by displaying, on a display screen, the visually highlighted synthetic vision images of the obstacles overlying the EVS images (step 170).

Method 100 continues by generating and displaying a three-dimensional image of a topographical environment around the vehicle (steps 180 and 190, respectively). The visually highlighted synthetic vision images of the obstacles overlying the EVS images may be overlaid over a portion of the three-dimensional image of the topographical environment (step 200).

It is to be appreciated that systems and methods for enhanced display of obstacles in a combined vision display have been provided. The vehicle operator gains heightened obstacle awareness by selectively bringing the obstacles (more specifically, the synthetic vision images of one or more obstacles) to the front of the combined vision display (by overlaying the synthetic vision images of the one or more obstacles over the EVS images) and selectively visually highlighting the synthetic vision images of the one or more obstacles, thereby increasing the potential of obstacle detection and avoidance regardless of obstacle size, and other conditions.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for enhanced display of obstacles in a combined vision display for a vehicle, the system comprising:
 a display unit;
 an enhanced vision system having a camera that generates a first signal representative of an enhanced vision image;
 a source of a selection that indicates the obstacles to be overlaid in front of the enhanced vision image based on at least one of a size of the obstacle and a type of the obstacle;
 a data storage device containing obstacle data representative of the selected obstacles and terrain data relating to terrain proximate the vehicle;
 a synthetic vision system configured to retrieve the selected obstacle data and the terrain data from the data storage device and generate second signals representative of a synthetic vision image of a topographical environment around the vehicle, the synthetic vision image including the selected obstacles and terrain;
 a processor in operable communication with the display unit and coupled to receive the first and second signals and configured, in response thereto, to:
  overlay the selected obstacles of the synthetic vision image over the enhanced vision image;
  command the display unit such that the combined vision display displays the synthetic vision image, including the selected obstacles and the terrain, in a synthetic vision image window associated with the combined vision display; and
  command the display unit such that the combined vision display displays the selected obstacles of the synthetic vision image overlaid over the enhanced vision image in an enhanced vision image window of the combined vision display such that the selected obstacles are displayed in both the enhanced vision image window and the synthetic vision window.

2. The system of claim 1, wherein the synthetic vision image of the selected obstacles are selectively overlaid over the enhanced vision image based on a detection range of the enhanced vision system.

3. The system of claim 1, wherein the source of the selection is an operator of the vehicle, the processor, or both.

4. The system of claim 1, wherein the processor is further configured to selectively visually highlight the synthetic vision image of the selected obstacles and to command the display unit to display the visually highlighted synthetic vision image of the selected obstacles overlaid over the enhanced vision image.

5. The system of claim 1, wherein the processor is further configured to select the synthetic vision image of the selected obstacles to be visually highlighted.

6. The system of claim 4, wherein:
 the display unit is further configured to display the visually highlighted synthetic vision image of the selected obstacles overlaid over the enhanced vision image overlying a portion of the synthetic vision image.

7. The system of claim 6, wherein the synthetic vision image of the selected obstacles overlaying the enhanced vision image are visually enhanced by increased intensity, color, shape, or combination thereof.

8. The system of claim 6, wherein the processor is further configured to change at least one visual characteristic of the synthetic vision image to visually distinguish the selected obstacles from the terrain data therein.

9. The system of claim 8, wherein a color, an opacity, a shape, or a combination thereof of the synthetic vision image of the terrain, the selected obstacles, or both are changed to visually distinguish the synthetic vision image of the selected obstacles from the terrain data.

10. The system of claim 9, wherein the selected obstacles are displayed having an opacity that is greater than the opacity of the terrain.

11. The system of claim 8, wherein the processor is further configured to command the display unit to blank out at least a portion of the underlying synthetic vision image of the terrain.

12. The system of claim 8, wherein the processor is further configured to command the display unit to increase a brightness of the selected obstacles relative to one or both of the underlying enhanced vision image and the synthetic vision image of the terrain.

13. The system of claim 8, wherein the processor is further configured to select which synthetic vision image of the selected obstacles to display in the synthetic vision image overlying the enhanced vision image and the synthetic vision image of the terrain.

14. A method for enhanced display of obstacles in a combined vision display of a vehicle, the method comprising:
 generating an enhanced vision image from a camera of the vehicle;
 receiving a selection from an operator of the vehicle that indicates the obstacles to be overlaid in front of the enhanced vision image;
 generating a three-dimensional synthetic vision image of a topographical environment proximate the vehicle, the topographical environment comprising terrain and the selected obstacles;
 overlaying the selected obstacles from the synthetic vision image over the enhanced vision image;
 selectively visually highlighting the selected obstacles of the synthetic vision image overlying the enhanced vision image;
 displaying the visually highlighted synthetic vision image of the obstacles overlying the enhanced vision image in an enhanced vision image window of the combined vision display; and
 displaying the synthetic vision image of the topographical environment, including the terrain and the selected obstacles, in a synthetic vision image window of the combined vision display such that the selected obstacles are displayed in both the enhanced vision image window and the synthetic vision image window of the combined vision display.

15. The method of claim 14, further comprising the steps of:
 overlaying and displaying the visually highlighted synthetic vision image of the obstacles overlying the enhanced vision image over a portion of the three-dimensional synthetic vision image of the topographical environment and obscuring the portion of the three-dimensional synthetic vision image of the topographical environment underlying the enhanced vision image.

16. The method of claim 14, wherein the step of receiving the selection from the operator of the vehicle comprises selecting the obstacles based on one or both of obstacle size and obstacle type.

17. The method of claim 14, wherein the step of overlaying the synthetic vision image over the enhanced vision image comprises selectively overlaying the synthetic vision image based on a detection range of the enhanced vision image.

18. A flight deck display for an aircraft, the flight deck display comprising:

a display screen;

a display unit operatively connected to the display screen and configured to receive commands from a processor instructing the display unit to display, on the display screen:

a synthetic perspective image of topography for a region proximate the aircraft, the synthetic perspective image of topography comprising a synthetic vision image of one or more obstacles and terrain, the synthetic vision image displayed in a synthetic vision image window of the display screen;

an enhanced vision image overlying a portion of the synthetic perspective image of the topography, the enhanced vision image received from a camera associated with the aircraft and displayed in an enhanced vision image window of the display screen; and the synthetic vision image of one or more selected obstacles overlying the enhanced vision image and the synthetic vision image of the terrain such that the selected obstacles are displayed in both the enhanced vision image window and the synthetic vision image window, wherein the one or more obstacles are selected based on a size of the obstacle and a type of the obstacle by an operator of the aircraft.

19. The flight deck display of claim 18, wherein the synthetic vision image of the selected obstacles is visually highlighted relative to the underlying enhanced vision image.

* * * * *